(12) United States Patent
Kew

(10) Patent No.: US 9,037,522 B2
(45) Date of Patent: May 19, 2015

(54) MONITORING METHOD AND SUBSYSTEM THAT DETECTS ABNORMAL SYSTEM STATES

(71) Applicant: VMware, Inc., Palo Alto, CA (US)

(72) Inventor: John Victor Kew, Seattle, WA (US)

(73) Assignee: VMware, Inc., Palo Alto, CA (US)

( * ) Notice: Subject to any disclaimer, the term of this patent is extended or adjusted under 35 U.S.C. 154(b) by 258 days.

(21) Appl. No.: 13/790,228

(22) Filed: Mar. 8, 2013

(65) Prior Publication Data

US 2014/0258791 A1 Sep. 11, 2014

(51) Int. Cl.
G06F 11/07 (2006.01)
G06N 3/02 (2006.01)
G06N 3/08 (2006.01)

(52) U.S. Cl.
CPC .......... *G06F 11/0751* (2013.01); *G06N 3/02* (2013.01); *G06N 3/088* (2013.01)

(58) Field of Classification Search
None
See application file for complete search history.

(56) References Cited

U.S. PATENT DOCUMENTS

| 7,801,703 | B2 | 9/2010 | Marvasti |
| 2010/0036643 | A1 | 2/2010 | Marvasti et al. |
| 2010/0082638 | A1 | 4/2010 | Marvasti |

OTHER PUBLICATIONS

Novak, Nonlinear System Identification and Control Using Local Model Networks, Doctoral Thesis, Tomas Bata University, Feb. 2007, pp. 1-99.*
Kohonen, Teuvo, "The Self-Organizing Map", Proceedings of the IEEE, vol. 78, No. 9, Sep. 1990, pp. 1464-1480.
Ahola, Jussi, "Monitoring industrial processes using the self-organizing map" (Abstract only), IEEE Conference, 1999.
Hoglund, Albert J., "A computer host-based user anomaly detction system using the self-organizing map", IEEE 2000, pp. 411-416.
Alahakoon, Damminda et al., "Dynamic Self-Organizing Maps with Controlled Growth for Knowledge Discovery", IEEE, vol. 11, No. 3, May 2000, pp. 601-614.
Come, Etienne et al., "Aircraft engine health monitoring using Self-Organizing Maps", SAMM—Universit Paris, Feb. 19, 2010.
Abonyi, Janos, "System Identification using Delaunay Tessellation of Self-Organizing Maps", University of Veszprem.

* cited by examiner

*Primary Examiner* — Wilbert L Starks

(57) ABSTRACT

The current application is directed to monitoring subsystems, and monitoring methods incorporated within the monitoring subsystems, that monitor operation of devices and systems in order to identify normal states and to quickly determine when a device or system transitions from a normal state to an abnormal state. The methods and monitoring components to which the current application is directed employ self-organizing maps and moving-average self-organizing maps to both characterize normal system behavior and to identify transitions to abnormal system behaviors.

20 Claims, 20 Drawing Sheets

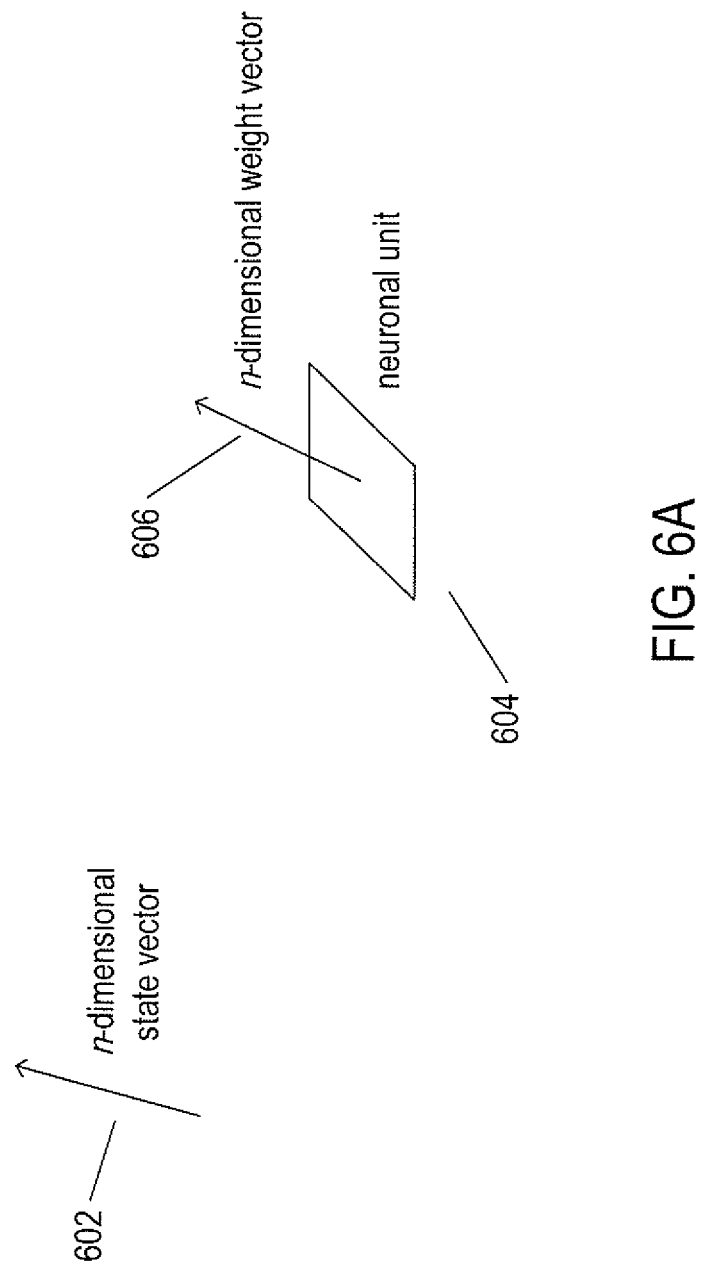

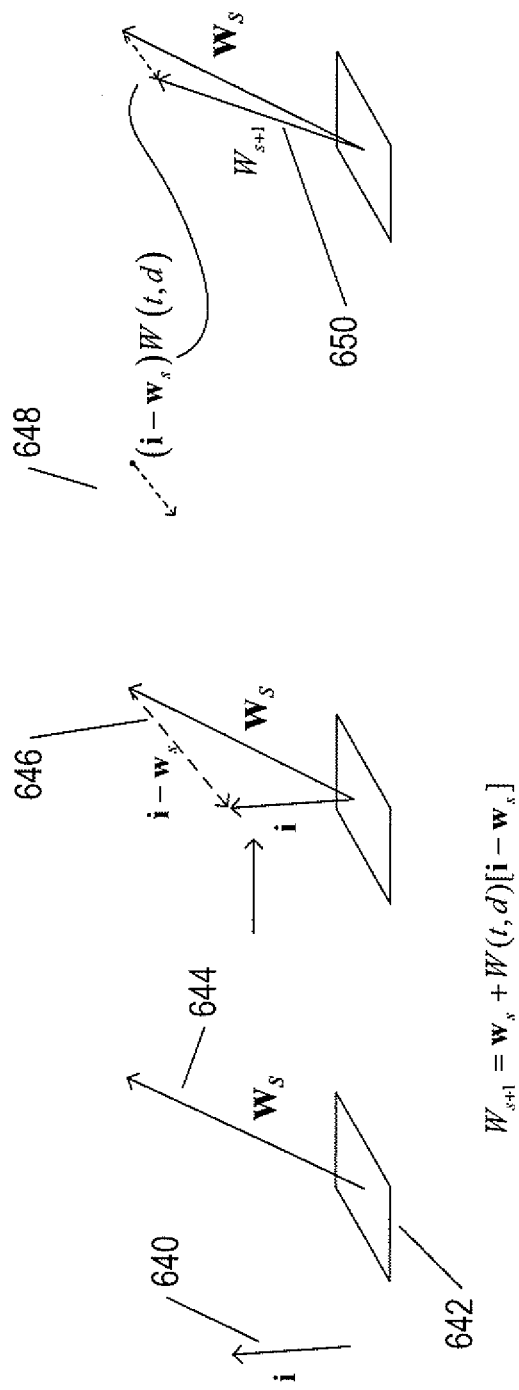

MONITORING METHOD AND SUBSYSTEM THAT DETECTS ABNORMAL SYSTEM STATES

TECHNICAL FIELD

The current application is directed to the design and implementation of devices and systems, including computer systems, and, in particular, to methods and monitoring subsystems which monitor the operational states of devices and systems in order to detect entry of the devices and systems into an abnormal state.

BACKGROUND

The advent of modern computing technologies, including processors, mass-storage devices, electronic memories, and digital communications, has spawned the development of a vast array of processor-controlled devices and systems during the past 60 years, including many different types of computing systems. As processor speeds, memory and mass-storage-device capacities, and digital-communication bandwidths have rapidly increased, early stand-alone computer systems have evolved into highly complex parallel-processing and distributed computer systems with many orders of magnitude greater computational bandwidths than early mainframe computer systems. Moreover, processor control has been introduced into many, if not most, of the many complex devices and systems used and produced in modern social and technological environments, including consumer devices, such as cameras, telephones, and television sets, to automobiles, airplanes, locomotives, power plants, traffic-control and power grids, machine tools, automated manufacturing plants, hospitals, and commercial establishments. Many of these complex systems, including computer systems, include control sub-systems implemented as large control programs, such as operating systems that control computer systems. The control programs may be specified by hundreds of thousands, millions, or more lines of high-level-language computer code that encodes complex and intricate control logic.

During operation, complex processor-controlled systems may inhabit many different operational states. These operational states may be characterized by various types of metrics, the values of which, at any particular point in time, may be considered as a state vector that describes the state of the complex system much like state vectors describe the state of physical systems in classical and quantum mechanics. In general, during normal operations, although a system may traverse a multitude of different states and may rapidly transition from one state to another, many systems tend to inhabit relatively small sub-spaces of the total state space which can be regarded as normal states. For example, when the rate of data traffic between a storage sub-system and a main system bus within a computer system is regarded as one of the state-defining metrics, the instantaneous rate of data exchange may constantly fluctuate, but the time-averaged data rate over seconds or minutes may generally inhabit a relatively small number of data-exchange-rate ranges correlated with a relatively small number of different types of computational loads, in turn correlated with higher-level cycles of system operation. For example, a computer system used within an automated factory may inhabit a high-computational-load state at the beginning of each production shift, a modest, steady-state computational load during each production shift, and a very low computational load between production shifts. The clusters of state-vector values which compose higher-level logical system states may depend on a plethora of system design characteristics, operational characteristics, and external environment characteristics, and may be difficult to predict in advance of system operation.

It is also often the case that systems may, for a variety of both predictable and unpredictable reasons, transition into abnormal, infrequently observed higher-level states, such as when system components fail, when an external power supply fails, and for many other reasons. Because of the immense size of the state space available to a complex system, it may be difficult for system operators and administrators, as well as for automated system-monitoring functionality, to recognize transitions from higher-level logical system states normally inhabited by a complex system to abnormal states. Quite often, entry of complex system into an abnormal state may precipitate a series of undesirable state transitions leading to ever more destructive abnormal states and to complete system failure. The earlier a transition from a normal higher-level logical state to an abnormal state is recognized, the greater the chance that timely interventions can be carried out to return the system to a normal state in order to prevent total failure and ameliorate damage. Designers and developers of complex systems, manufacturers of complex systems, those who maintain complex systems and, ultimately, users of complex systems all continue to seek methods and monitoring components that facilitate monitoring of the operational characteristics of devices and systems and detection of transitions of devices and systems into abnormal states.

SUMMARY

The current application is directed to monitoring subsystems, and monitoring methods incorporated within the monitoring subsystems, that monitor operation of devices and systems in order to identify normal states and to quickly determine when a device or system transitions from a normal state to an abnormal state. The methods and monitoring components to which the current application is directed employ self-organizing maps and moving-average self-organizing maps to both characterize normal system behavior and to identify transitions to abnormal system behaviors.

BRIEF DESCRIPTION OF THE DRAWINGS

FIGS. 6A-G illustrate a state-vector self-organizing map ("SOM") that is used, in methods and monitoring sub-systems to which the current application is directed, to identify normal operational states of a device or system.

DETAILED DESCRIPTION OF EMBODIMENTS

The current application is directed to monitoring the operational behavior of devices and systems in order to characterize the normal modes, or normal states, of device or system operation and to quickly identify when the device or system departs from normal operational states to abnormal operational states. The current application is directed both to monitoring methods as well as to monitoring components and sub-systems that incorporate these methods. It should be noted, at the onset, that the methods to which the current application is directed may be implemented as computer instructions stored in physical computer-instruction-storage devices and media for access and execution by one or more processors within a device or system. One occasionally encounters characterizations of such computer-instruction-implemented control logic as being "software only" or "abstract." Computer-instruction-implemented control logic is neither abstract nor "software only." Computer instructions stored on physical media are tangible, non-abstract, and necessary components of most modern processor-controlled devices and systems and are as tangible and physical as screws, power supplies, disk drives, processors, cabling, and other such physical components of devices and systems.

Figure 1:
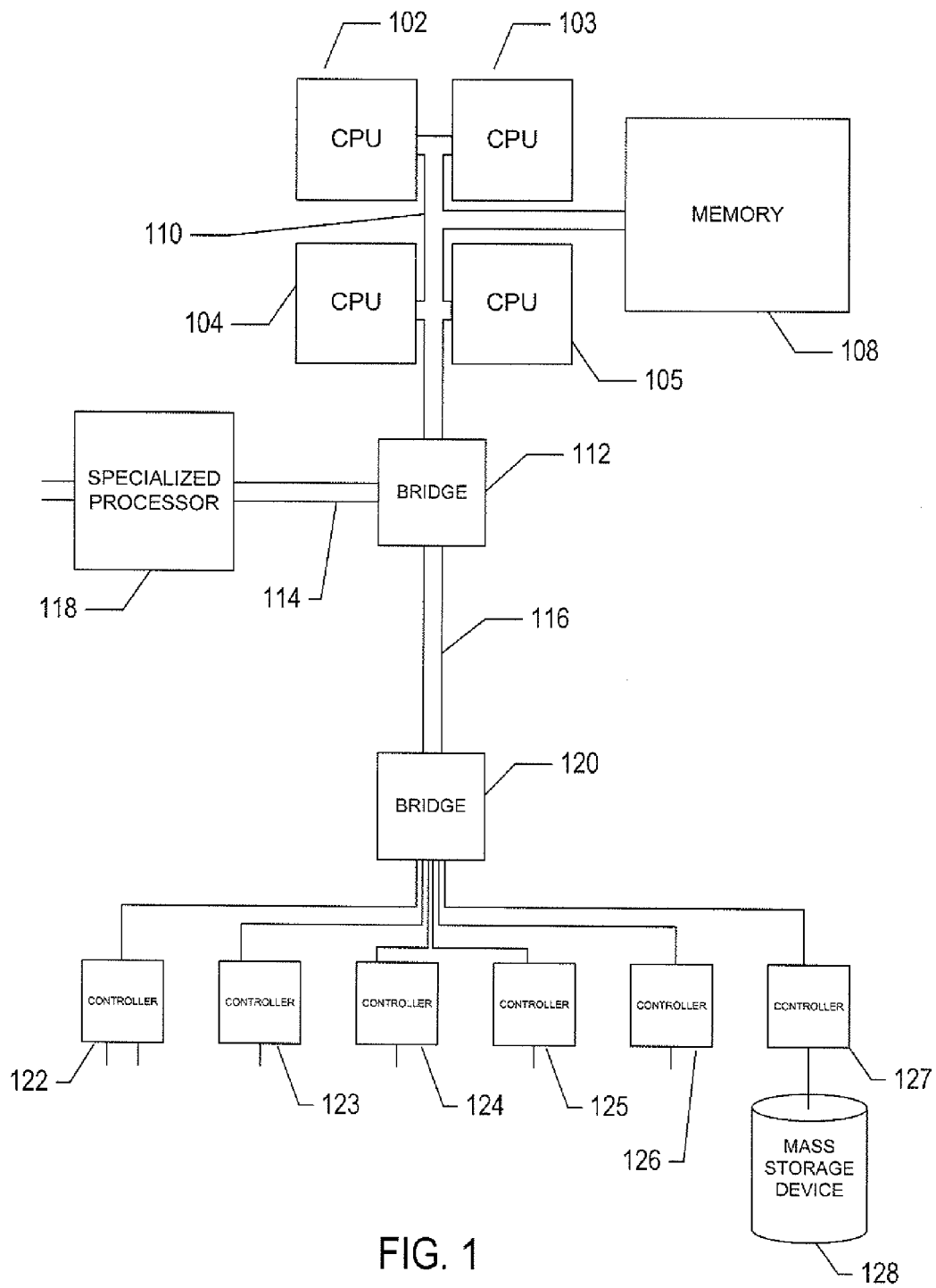
FIG. 1 provides a general architectural diagram for various types of computers.

FIG. 1 provides a general architectural diagram for various types of computers. The computer system contains one or multiple central processing units ("CPUs") 102-105, one or more electronic memories 108 interconnected with the CPUs by a CPU/memory-subsystem bus 110 or multiple busses, a first bridge 112 that interconnects the CPU/memory-subsystem bus 110 with additional busses 114 and 116, or other types of high-speed interconnection media, including multiple, high-speed serial interconnects. These busses or serial interconnections, in turn, connect the CPUs and memory with specialized processors, such as a graphics processor 118, and with one or more additional bridges 120, which are interconnected with high-speed serial links or with multiple controllers 122-127, such as controller 127, that provide access to various different types of mass-storage devices 128, electronic displays, input devices, and other such components, subcomponents, and computational resources.

Figure 2:
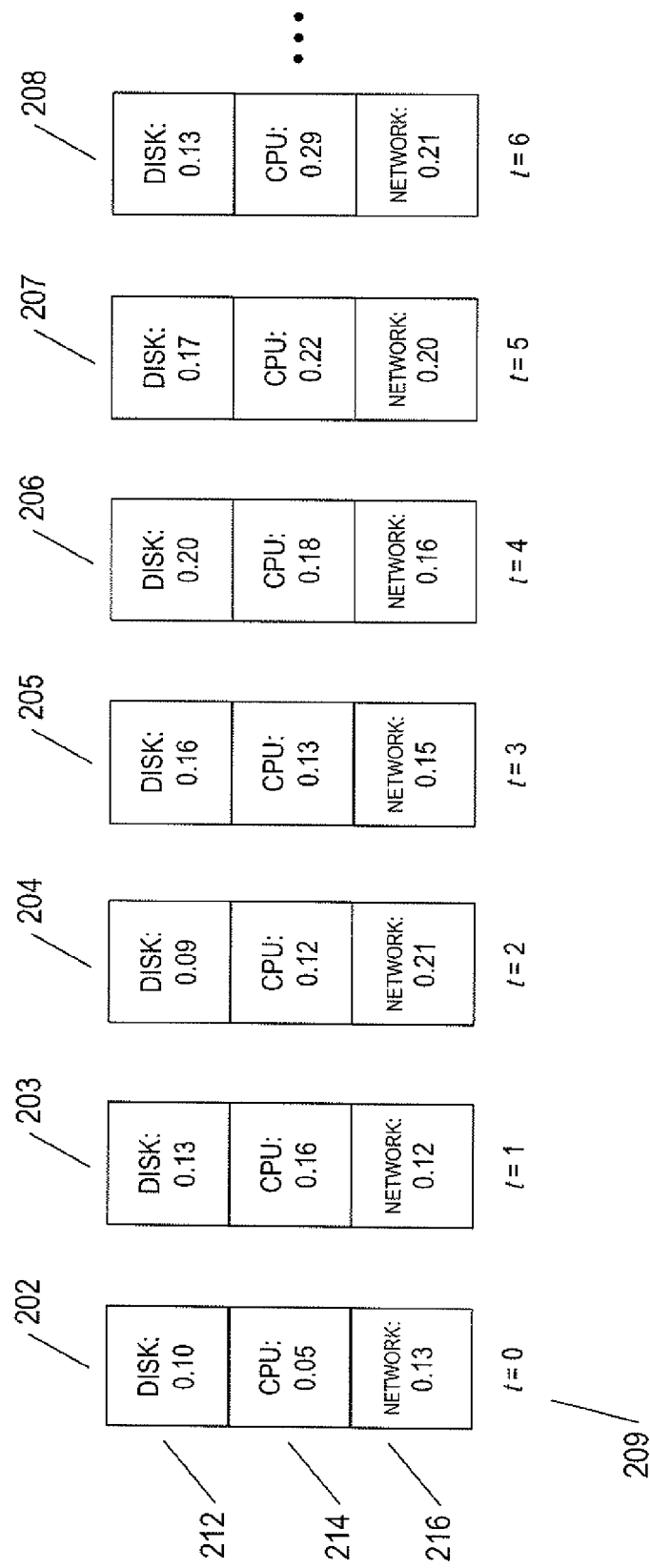
FIG. 2 illustrates a state vector for a computer system as an example of state vectors used to characterize the operational characteristics of devices and systems, in general.

FIG. 2 illustrates a state vector for a computer system as an example of state vectors used to characterize the operational characteristics of devices and systems, in general. In FIG. 2, seven different state vectors 202-208 are shown. The state vectors are arranged sequentially in time, with an indication of the time that each state vector was recorded provided below the state vector, such as the indication 209 indicating that state vector 202 was recorded at time t=0. In general, there is a state vector that characterizes operation of a system at each instant in time. Often, a monitoring component of a system may record state vectors for the system at regular intervals in time or upon the occurrence of various different types of events.

In the example shown in FIG. 2, each state vector includes the values measured for three different metrics: (1) disk utilization 212; (2) CPU utilization 214; and (3) network utilization 216. The fields are described with respect to the first state vector 202 and occur uniformly throughout all of the state vectors 202-208 in FIG. 2. In the example shown in FIG. 2, the disk utilization, CPU utilization, and network utilization metric values range from 0 to 1, and represent a fraction of the total capacity and/or bandwidth being used at the instant in time at which the state vector is recorded. These are simple, hypothetical metrics used for illustration purposes. In actual systems, there may be many different individual metrics and metric aggregations used to create state vectors of high dimensionality. For example, metrics may include times of day, days of the week, month, year, whether or not the current day is a holiday, and other time-based metrics. These types of metrics may provide correlations with various time-based cyclic operational behavior. Other metrics may include indications of the current weather, stock-market performance, commodity prices, and the number of accesses to web pages or web articles about particular subject matter. Essentially, any metric that provides information about the environment, natural or abstract, in which a system operates may be considered for inclusion in state vectors. Each different metric value included in a field of a state vector generally represents a dimension of the state-vector space. In many formal vector-space systems, the dimensions are orthogonal, and in the currently described systems, orthogonal dimensions are desirable. However, in devices and systems, many of the different metrics used to construct state vectors may be directly or indirectly interdependent. The values for metrics are determined through system calls, through calls to application programs, and through calls to remote computer systems. The called functionality directly or indirectly evaluates one or more metrics. For example, metrics related to system-resource usage, time of day, and other such metrics can be obtained by system calls that return current values for these metrics. Values for metrics related to environmental conditions may be obtained by calls to interface routines of various types of monitoring systems and functionality.

Figure 3:
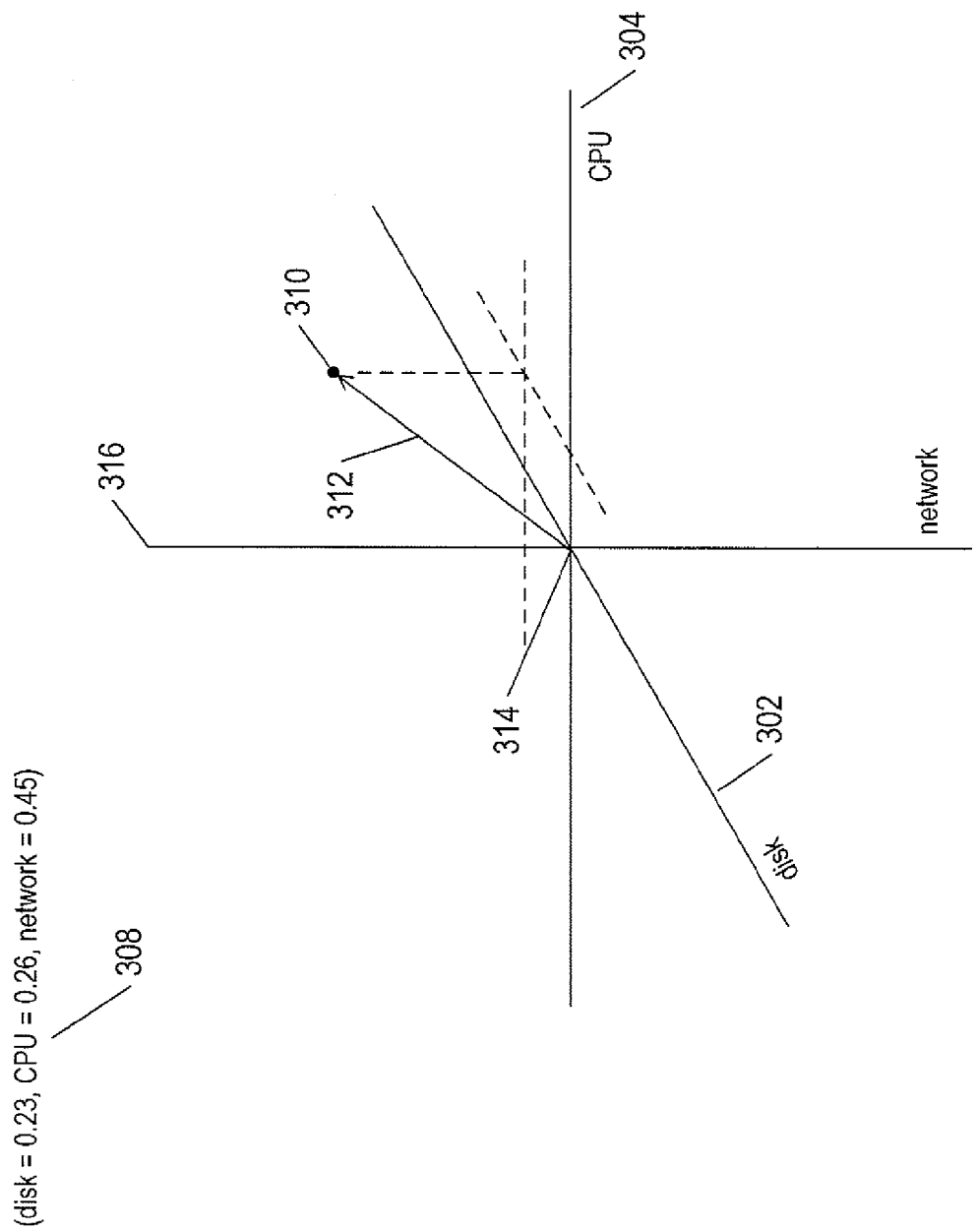
FIG. 3 illustrates how a state vector, such as the state vectors shown in FIG. 2, may be considered to be vectors in the mathematical sense.

FIG. 3 illustrates how a state vector, such as the state vectors shown in FIG. 2, may be considered to be vectors in the mathematical sense. In FIG. 3, a three-dimensional Cartesian coordinate system is shown with an axis corresponding to the disk-utilization metric 302, an axis corresponding to the CPU-utilization metric 304, and an axis corresponding to the network utilization metric 306. A particular instance of the state vector 308 may be plotted as a point 310 within this Cartesian coordinate system. The point can also be regarded as a vector 312 that connects the origin of the coordinate system 314 with the point 310. The metric values that define the state vector 308 are considered to be the components or coordinates of vector 312. In the current example, because all of the metrics fall within the range [0,1], all of the state vectors fall within a cube of unit volume in the positive octant of the three-dimensional Cartesian coordinate space with edges coincident with the coordinate axes. In many cases, metric values may be both positive and negative, in which case the state vectors may fall within a larger portion of the total n-dimensional space, where n is the number of metric values that define a state vector or, in other words, the dimensionality of the state vectors.

As mentioned in a preceding subsection, there may be a large number of possible different state vectors for any particular device or system. Depending on the range and granularity of the possible values for each metric, the number of different possible state vectors may be an extremely large number. For example, were ten different metrics, each with 1,000 different possible values, used to define a state vector, the number of possible state vectors would be $1000^{10}$ or $10^{30}$. Even were a different, unique state vector recorded every millisecond during operation of a computer system, the computer system would have to operate far longer than the known age of the universe in order to generate all possible state vectors. Thus, only a tiny subspace of the total potential vector space can ever be observed during device or system operation. Moreover, as also mentioned above, many devices and complex systems generally tend to inhabit a finite number of higher-level logical states during normal operation.

Figure 4:
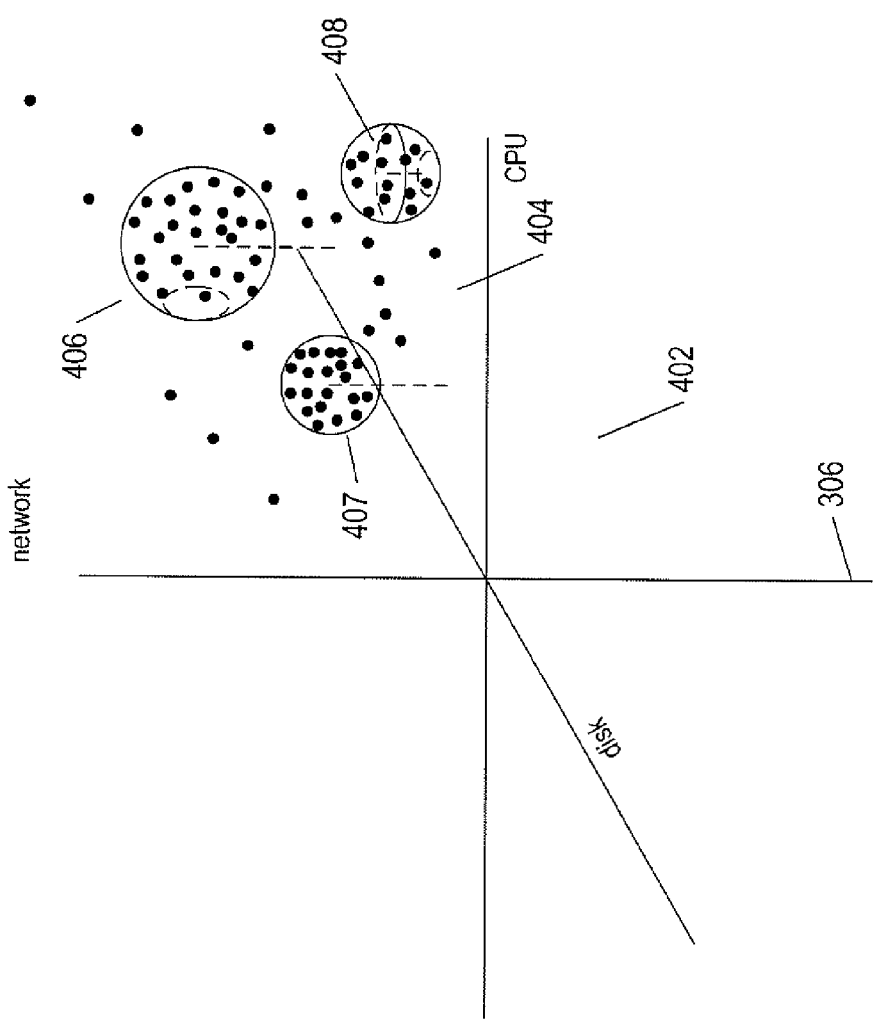
FIG. 4 illustrates three normal states for a hypothetical device or system for which state vectors, such as those shown in FIG. 2, are generated during operation of the device or system.

FIG. 4 illustrates three normal states for a hypothetical device or system for which state vectors, such as those shown in FIG. 2, are generated during operation of the device or system. In FIG. 4, points corresponding to different observed state vectors are plotted within a three-dimensional Cartesian coordinate system 402 equivalent to that discussed above with reference to FIG. 3. Although state vectors of the present example may fall generally within the positive octant, it often is the case that the plotted states tend to be concentrated in relatively small subspaces. For example, in FIG. 4, there is a relatively large concentration of points corresponding to recorded state vectors within three spherical sub-volumes 406-408. Of course, sub-volumes need not be spherical. There are a variety of different ways to characterize such sub-volumes as, for example, continuously connected regions of greater than a threshold number of state vectors per unit volume. However characterized, it is the case that, during normal system operation, the distribution of recorded state vectors is often quite non-uniform and there are generally a small number of regions with high concentrations of accumulated state vectors. These regions of high concentrations of recorded state vectors represent higher-level, logical states and, because they are observed during normal system operation, are referred to as "normal states."

Figure 5:
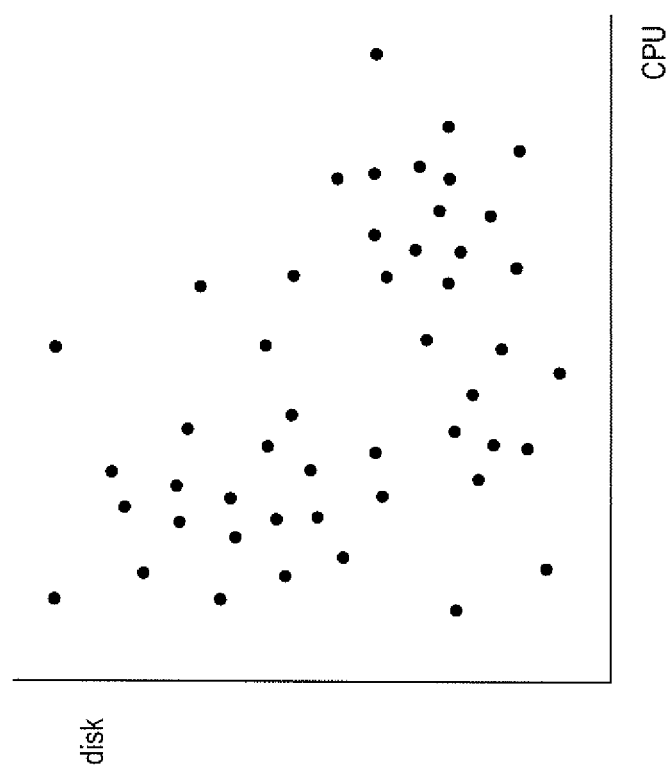
FIG. 5 shows a projection of a positive octant of the three-dimensional Cartesian space shown in FIG. 4 along the network axis.

It is often difficult to visualize and identify these normal states. For example, were the positive octant 404 of the three-dimensional Cartesian space shown in FIG. 4 projected along the network-utilization axis 306 onto a plane, the highly non-uniform distribution of recorded state vectors would not necessarily be apparent. FIG. 5 shows a projection of a positive octant of the three-dimensional Cartesian space shown in FIG. 4 along the network axis. Although the distribution of points is non-uniform, it is difficult, in FIG. 5, to determine that there are, in fact, three spherical normal-state regions of high state-vector density. Projection of a ten-dimensional state-vector space onto two or three dimensions would exponentially exacerbate the problem of identifying normal-state regions. Thus, while a monitoring sub-system within a complex system may be readily implemented to compute the values of a set of state-vector-defining metrics at regular intervals of time and record the observed state vectors, over time, it is far from straightforward for the monitoring sub-system to identify normal operational states from the aggregated and recorded state vectors.

Figure 6B:
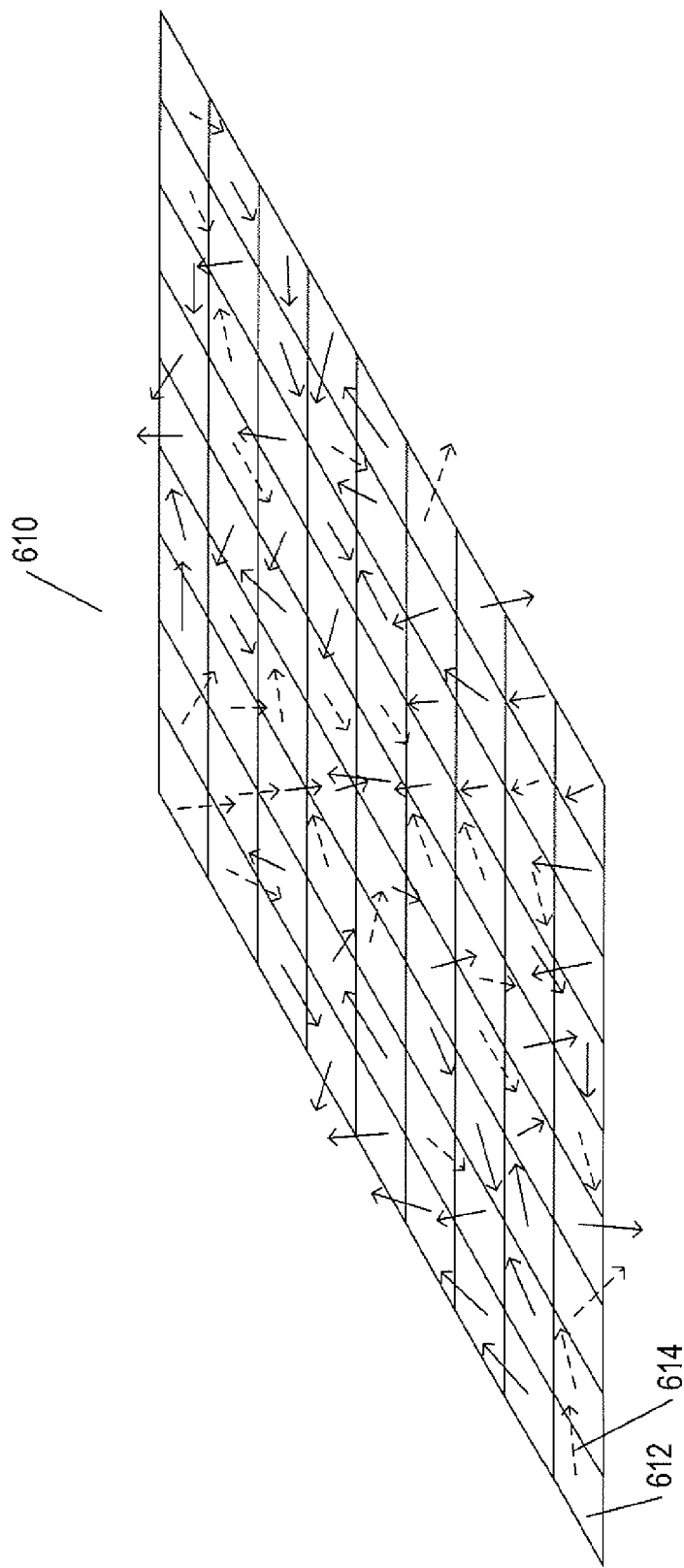

FIGS. 6A-G illustrate a state-vector self-organizing map ("SOM") that is used, in methods and monitoring sub-systems to which the current application is directed, to identify normal operational states of a device or system. FIG. 6A shows basic input elements and internal elements for a state-vector self-organizing map. Input elements are n-dimensional state vectors, such as n-dimensional state vector 602, where n is the dimensionality of the state vectors, discussed above. FIG. 6A also shows a neuronal unit 604, also referred to as a "unit," of a state-vector self-organizing map ("SOM"). The neuronal unit may be square, rectangular, hexagonal, or have another shape that allows for a complete tiling of a two-dimensional surface without leaving spaces between the neuronal units, in certain SOM representations. Each neuronal unit is associated with an n-dimensional weight vector. FIG. 6B shows a small, example state-vector self-organizing map.

The SOM, in the example shown in FIG. 6B, is a square planar surface or area 610 that is tiled with 81 neuronal units, such as neuronal unit 612. In other words, the SOM is a 9×9 matrix of neuronal units. In FIG. 6B, the weight vector associated with each neuronal unit is illustrated using an arrow, such as arrow 614 emanating from neuronal unit 612. Arrows pointing in directions below the surface of the SOM are illustrated using dashed arrow stems while arrows pointing in directions above the surface of the SOM and in the plane of the SOM are shown with solid stems. A SOM may be initialized with unit-length weight vectors having random directions. Alternatively, a SOM may be systematically initialized.

A SOM is updated by a sequence of input state vectors. For example, if state vectors are computed at regular intervals by a monitoring sub-system, a SOM is updated at regular intervals equal to the regular intervals at which the state vectors are generated. Over time, as further discussed below, the weight vectors in the SOM tend to self-aggregate into distinct regions, each region characterized by weight vectors of length and directions characteristic of the positions of the normal-state regions within an n-dimensional state-vector space. The SOM is therefore a powerful and useful method for identifying the normal states of a device or system's operation in a two-dimensional representation of a much higher-dimensionality state-vector space. It is also possible to use 3-dimensional SOMs, although visualization is more complex.

Figure 6C:
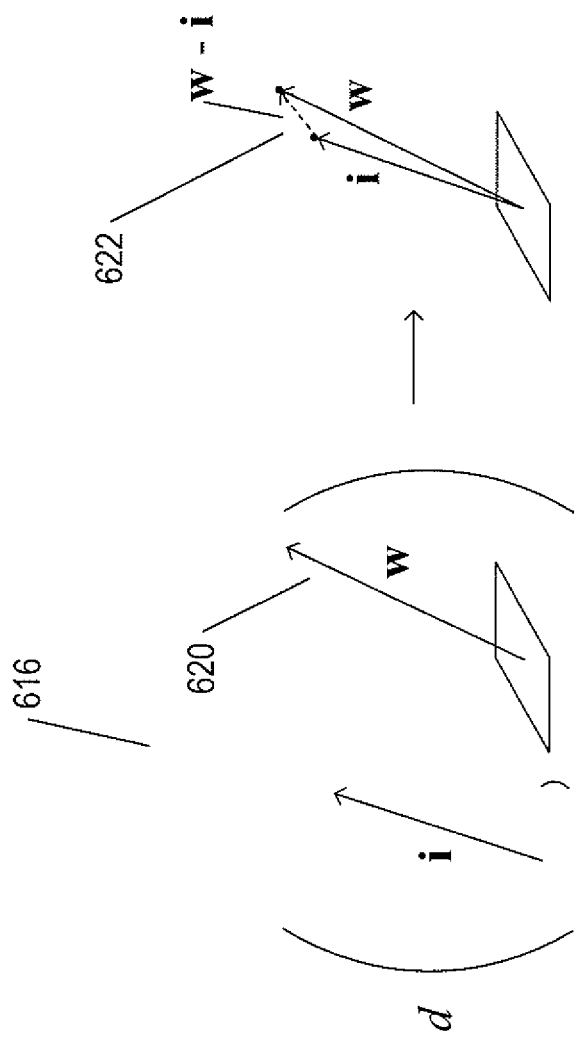

FIG. 6C illustrates a distance-based comparison operation used to compare input state vectors with SOM weight vectors. As shown in FIG. 6C, the comparison operation d( ) 616 is a two-operand operation. The two operands include an input state vector 618 and a SOM weight vector 620. The operation returns a scalar value equal to the Euclidean distance between an input state vector i and a SOM weight vector w, which is the length of the vector w−i 622, |w−i|, or, in other words:

$$\begin{aligned}d(i, w) &= \text{length}(w - i) \\ &= \text{length}(i - w) \\ &= \sqrt{(w - i) \cdot (w - i)} \\ &= \sqrt{(i - w) \cdot (i - w)}.\end{aligned}$$

The distance operation is used as an example of a distance metric for comparing input state vectors with neuronal-unit weight vectors. Other distance metrics can be used.

During the update operation, an input state vector is compared to the weight vectors within the SOM to identify a best-matching weight vector within the SOM, which is the weight vector that, when used as the second operand in the above-discussed distant metric, returns the minimum distance-metric value from among all of the weight vectors in the SOM. When multiple weight vectors have the same, minimal distance from the input state vector, an additional method may be used to select one of the multiple weight vectors with the minimal distance as the best-matching weight vector. The neuronal unit of the SOM that includes the best-matching weight vector is referred to as the best-matching unit ("BMU"). The update operation is carried out on the BMU and on those neuronal units of a SOM in the neighborhood of the BMU.

Figure 6D:
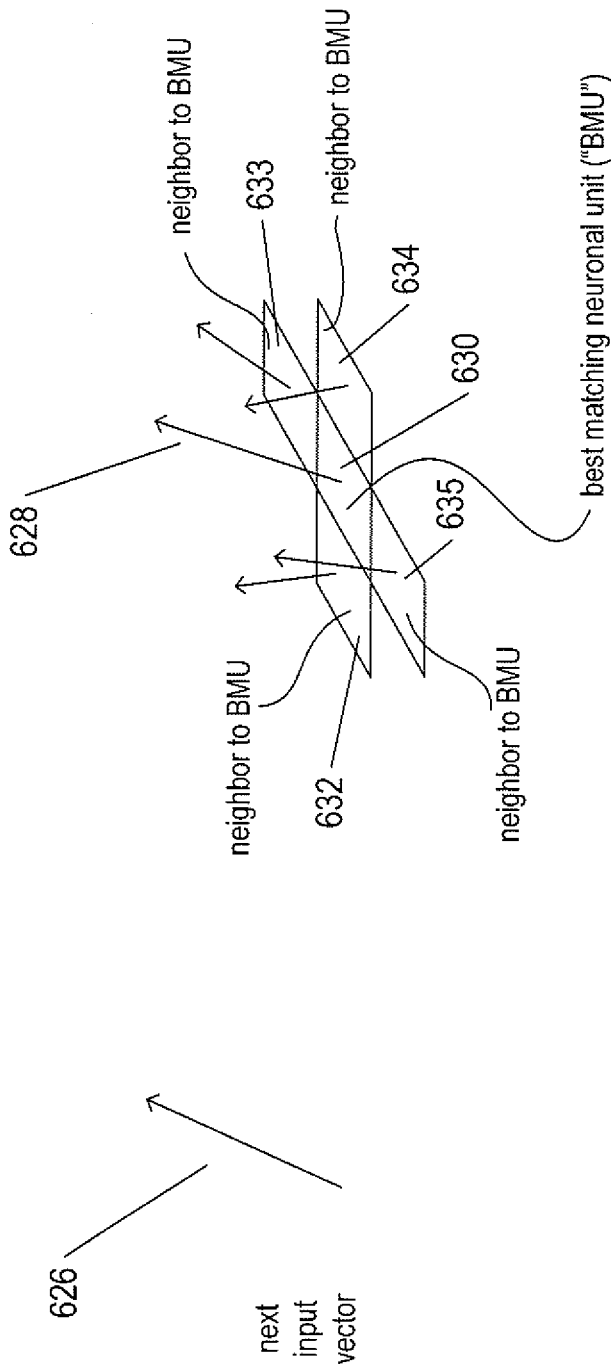

FIG. 6D illustrates the neighborhood of a BMU. In FIG. 6D, an input state vector 626 has been compared to the weight vectors in a SOM to identify a best-matching weight vector 628 and corresponding BMU 630. In this example, those adjacent neuronal units that share a side with the BMU 632-

635 are regarded as the neighborhood of the BMU 630. Alternative definitions of the neighborhood of a BMU may be used. For example, the neighborhood of a BMU may be defined to include not only those neuronal units that share a side with the BMU, but also those neuronal units that share a point with the BMU. This second definition of the neighborhood of a BMU would include four additional neuronal units, each of which shares two sides with neighbors 632-635. Even larger neighborhoods may be defined.

FIG. 6E illustrates the update operation carried out for a next input state vector with respect to a BMU and all neuronal units in the neighborhood of the BMU. In FIG. 6E, a next input state vector i 640 is shown along with a neuronal unit 642 containing a weight vector 644 at the current point in time s or in a current step in a sequence of state-vector-input steps s. The update operation may change either or both of the direction and length of the weight vector $w_s$ 644. The update operation first computes the vector $i-w_s$ 646 that points from the head of the weight vector $w_s$ to the input state vector i. Next, the computed vector $i-w_s$ is multiplied by a scalar value returned by a weighting function W( ) 648 which generally changes the length of the computed vector $i-w_s$ unless the weighting function returns a value of 1. The weighting function W( ) takes two arguments: (1) t, an argument specifying a current time or a current step in a sequence of SOM-update steps; and (2) d, the distance between the neuronal unit including the weight vector $w_s$ and the BMU. The weighted computed vector $(i-w_s) \cdot W(t,d)$ is then added to the weight vector $w_s$ to produce a next weight vector $w_{s+1}$ 650. To summarize, the update operation computes a new weight vector $w_{s+1}$ from a current weight vector $w_s$ by:

$$W_{s+1} = w_s + W(t,d)[i-w_s].$$

Figure 6G:
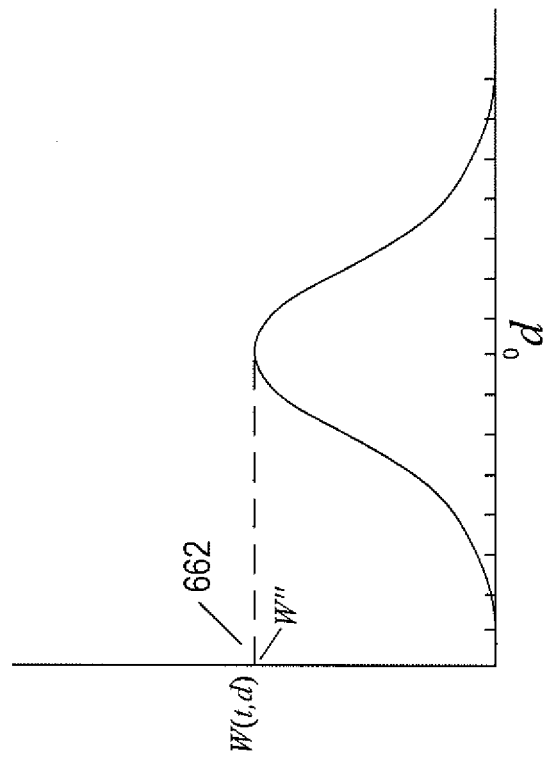
Figure 6F:
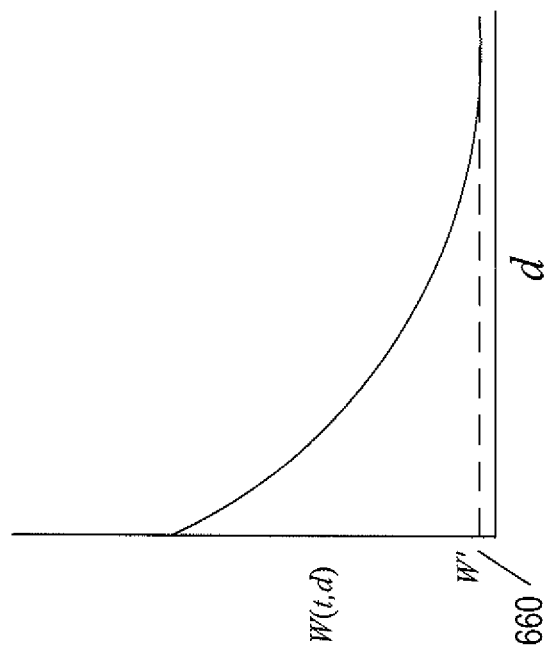

The weighting function W( ) computes a length-adjusting scalar value, as discussed above, based on the current time and the distance between a neuronal unit containing a weight vector to be adjusted and the BMU for an input state vector. FIGS. 6F-G provide examples of the dependence on the value returned by the weighting function W( ) with respect to the time and distance operands t and d, respectively. As shown in FIG. 6F, the value returned by the weighting function generally rapidly decreases, with increasing time, to a final, steady-state value W' 660. As shown in FIG. 6G, the weighting function generally returns the highest value for the BMU W''' 662 and returns increasingly lower values for neuronal units at increasing distances from the BMU. In one implementation, the weighting function may be viewed as a two-dimensional Gaussian surface centered on the BMU. However, a large variety of different particular weighting functions may be devised for particular SOM implementations.

Figure 7:
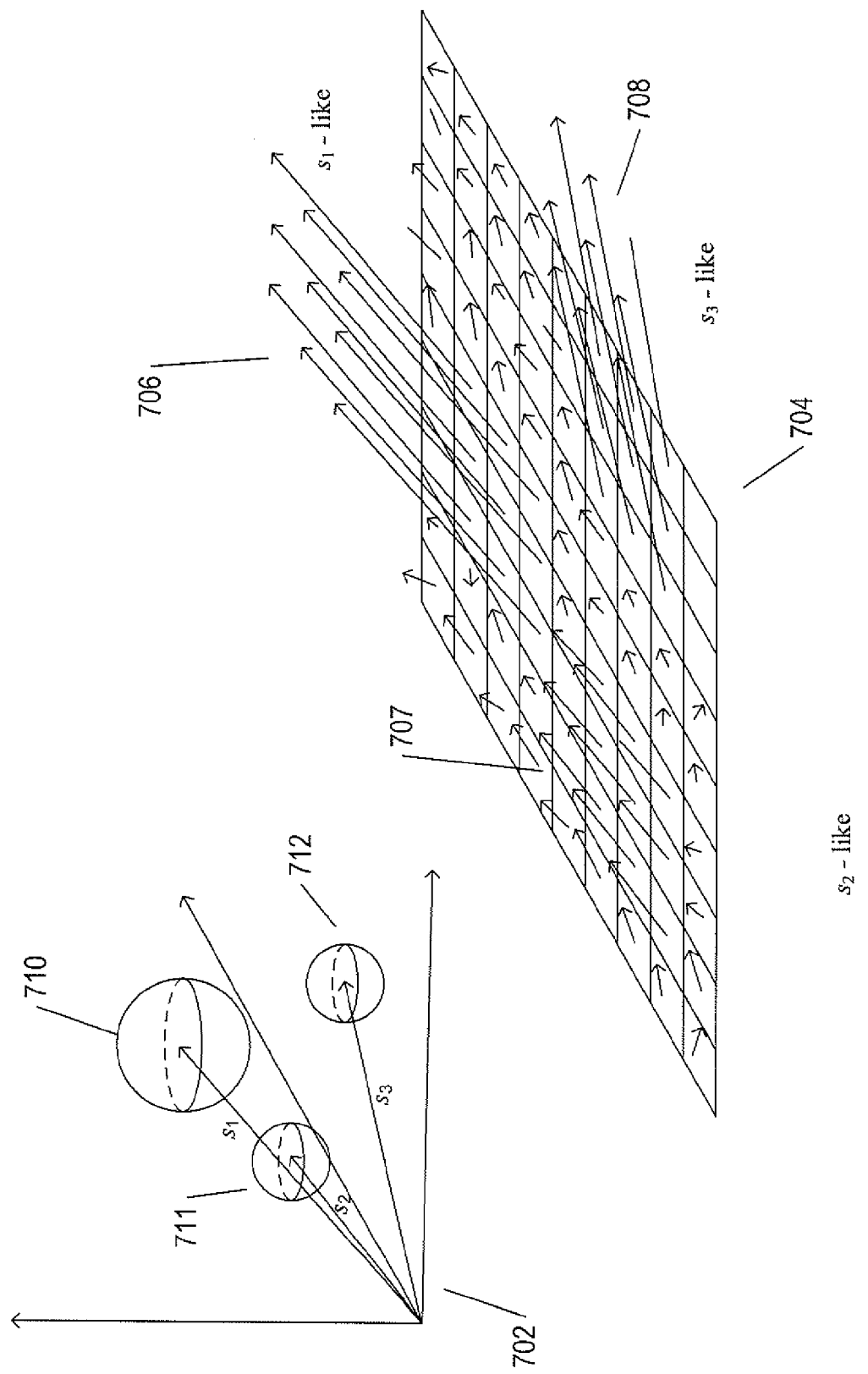
FIG. 7 illustrates evolution of the state-vector self-organizing map over time to reflect the normal states of a system.

FIG. 7 illustrates evolution of the state-vector self-organizing map over time to reflect the normal states of a system. In FIG. 7, the positive octant of the three-dimensional Cartesian state-vector space shown in FIG. 4 is again represented 702 along with a representation of a state-vector SOM 704 for a system for which state vectors, such as those shown in FIG. 2, are recorded at regular intervals and used to update the state-vector SOM, as discussed with reference to FIGS. 6A-G. As shown in FIG. 7, the neuronal units within a SOM, over time, partition themselves into three distinct regions 706-708 corresponding to normal-state regions 710-712, respectively. The weight vectors for each of these distinct regions have directions and lengths similar to, or related to, those of the vectors in the state-vector space pointing to the centroids of the normal-state regions. By using two-dimensional approaches for identifying these partitions within the state-vector SOM, the normal states associated with a device or system operation may be identified. Although a three-dimensional vector space can be visualized, the higher-dimensional vector spaces normally associated with higher-dimensional state vectors used in device and system monitoring cannot be visualized, and a SOM-based approach to identifying the normal-state regions represents a computationally tractable method for identifying the normal-state regions.

Figure 8:
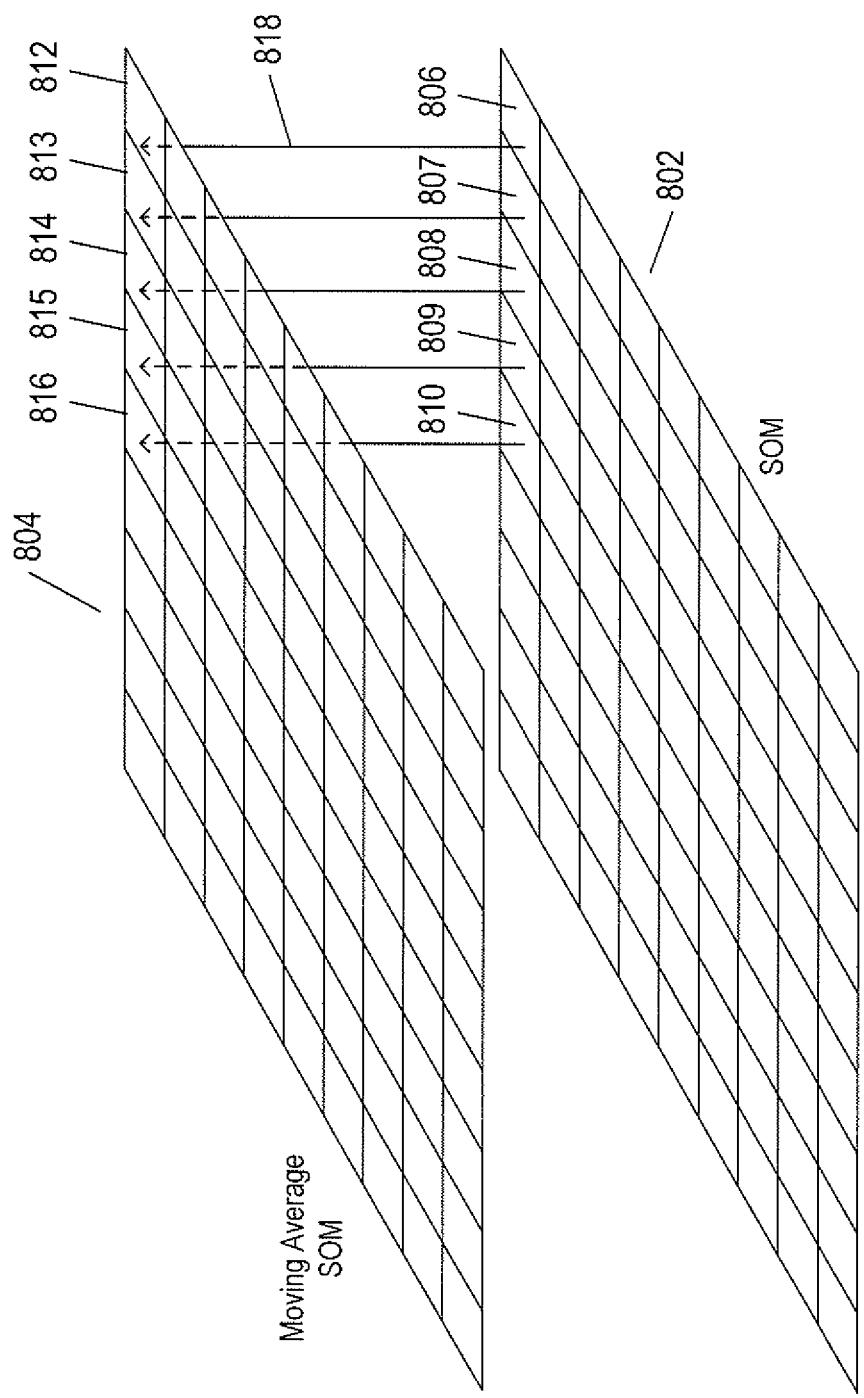
FIG. 8 illustrates a moving-average self-organizing map ("MASOM") aligned with a SOM.

The methods and monitoring sub-systems incorporating those methods to which the current application is directed employ not only a state-vector SOM, as discussed above with reference to FIGS. 6A-7, but additionally employ a scalar moving-average SOM ("MASOM") aligned with the SOM. FIG. 8 illustrates a moving-average self-organizing map aligned with a SOM. The SOM 802, as discussed above, is represented a planar area tiled with neuronal units. The MASOM 804 contains MASOM units aligned with the neuronal units of the SOM. In FIG. 8, the alignment of SOM neuronal units 806-810 with MASOM units 812-816 is illustrated with vertical arrows, such as vertical arrow 818 indicating the alignment of SOM neuronal unit 806 with MASOM unit 812. The MASOM units contain scalar values that are related to the updating of weight vectors in the corresponding SOM neuronal units. It should be noted that, in certain implementations, the MASOM may contain fewer units than the SOM, with each MASOM unit including a scalar value representative of the aggregate combination of updates to weight vectors of multiple SOM neuronal units to which the MASOM unit is mapped. The MASOM units are updated in similar fashion to the SOM neuronal units to which they are mapped. When a BMU is identified for a next input state vector, a corresponding BMU MASOM element is identified, and that MASOM element and its neighbors are updated, just as the BMU and the neighbors of the BMU are updated in the SOM. The MASOM is a moving-average map because the scalar values associated with MASOM elements represent the average of the values input to the MASOM elements during a most recent time interval. In other words, the scalars in the MASOM units reflect the recent input values to the MASOM units. The MASOM is more sensitive to changing patterns of inputs than the SOM. Essentially, the MASOM is a type of high-pass filter which allows a monitoring sub-system and monitoring method to quickly identify when the state of a device or system transitions from a normal logical state to an abnormal state. After an initial period of monitoring, when the SOM has self-organized into regions corresponding to normal states, the bulk of subsequent input state vectors should fall within regions corresponding to normal states. After the initial monitoring period, each element of the MASOM contains a scalar value reflective of the number of times that an input vector matched a SOM element or fell within the neighborhood of a matching SOM element corresponding to the MASOM element. Elements of the MASOM with low values, close to 0, generally correspond to SOM neuronal units associated with abnormal states while MASOM units with scalar values approaching 1 correspond to SOM neuronal units associated with normal logical states. Because the scalars associated with MASOM units are moving average values, the MASOM responds more quickly to abnormal state vectors than the SOM, in which the weight vectors represent cumulative histories over a generally much longer period of time.

The following pseudocode provides an example of how MASOM elements are updated. First, several constants are defined:

```
1 const int HSIZE = 100;
2 const int maxI = 10;
3 const int maxJ = 10;
```

The constant HSIZE is the size of a moving-average array and maxI and maxJ are the dimensions of a MASOM.

Next, a placeholder class and function are declared:

```
 4 class time
 5 {
 6 };
 7 double Weight(time t, double d)
 8 {
 9    return −1;
10 }
```

Instances of the class "time" represent a current system time for a device or system and the function Weight, a stub for which is provided on lines 7-10, is a weight function similar to the weight function discussed above with reference to FIGS. 6E-G and returns a value in the range [0,1]. The function Weight may be identical to the previously discussed weight function used for updating SOM weight vectors or may be different, in the case of the MASOM, elements of which are associated with scalars rather than vectors.

Instances of the class "element" are MASOM elements:

```
11 class element
12 {
13   private:
14     double value;
15     double history[HSIZE];
16     int in;
17     int out;
18
19   public:
20     double getValue( );
21     void setValue(double n);
22     double movingAverage(double input);
23     element( );
24 };
```

The private data member "value," declared on line 14, stores the scalar value associated with a MASOM element. The array "history," declared on line 15, is the history of the most recent input values to the element. This array is used as a circular first-in last-out buffer, with the integers "in" and "out," declared on lines 16-17, used as pointers into the history array for inputting a next value and extracting a next value, respectively. The class "element" includes member functions to get and set the associated scalar value, declared on lines 20-21, a constructor, declared on line 23, and a member function "movingAverage," declared on line 22, that receives a next input value in argument "input" and returns the current moving average of the history of input values, including the value input by argument "input."

An instance of the class "MASOM" is a MASOM used by a monitoring method and monitoring sub-system with a device or system:

```
25 class MASOM
26 {
27   private:
28     element map[maxI+1][maxJ+1];
29
30   public:
```

```
31     element* getElement(int i, int j);
32     int distance(int i, int j, int k, int l);
33     void update(int i, int j, time t);
34 };
```

The class "MASOM" includes a map of elements, declared on line 28. The class "MASOM" includes a member function "getElement" that returns a pointer to an element corresponding to input indices i and j, declared on line 31, a member function "distance" that computes the distance between an element with indices i and j and an element with indices k and l, declared on line 32, and a member function "update" that updates the MASOM when furnished with the coordinates of the BMU of a SOM as well as the current time.

A simple constructor for the class "element" is provided below:

```
35 element::element( )
36 {
37    in = 0;
38    out = 0;
39    value = 0;
40 }
```

An implementation of the element member function "movingAverage" is next provided:

```
41 double element::movingAverage(double input)
42 {
43    double outV;
44    double sum = 0;
45
46    if (in == 0 && out == 0)
47    {
48      history[0] = input;
49      in++;
50      return input;
51    }
52    else if (out == 0 && in < (HSIZE − 1))
53    {
54      history[in] = input;
55      for (int i = 0; i <= in; i++) sum += history[i];
56      in++;
57      return sum / in;
58    }
59    else
60    {
61      outV = history[out] / HSIZE;
62      out++;
63      if (out == HSIZE) out = 0;
64      history[in] = input;
65      in++;
66      if (in == HSIZE) in = 0;
67      return (getValue( ) − outV + input / HSIZE);
68    }
69 }
```

When the input value is the first value input to the element, as determined on line 46, the input value is stored in the first cell of the array "history," on line 48, and the input is returned as the moving average for the element. When the input value is not the first value input to the element, but is one of the initial HSIZE inputs to the element, as determined on line 52, then the input value is stored in the array "history," on line 54, and the current moving average is computed from values stored in the history array and returned on lines 55-57. Otherwise, on lines 61-67, the least recent entry of the history array is removed and the new input value is stored in the history array and a moving-average value is computed from the history array and returned.

An implementation of the MASOM member function "distance" is next provided:

```
70 int MASOM::distance(int i, int j, int k, int l)
71 {
72   int diffI = i - k;
73   int diffJ = j - l;
74
75   if (diffI == 0 && diffJ == 0) return 0;
76   else if (diffI != 0 && diffJ != 0) return -1;
77   diffI += diffJ;
78   if (diffI > -2 && diffI < 2) return 1;
79   else return -1;
80 }
```

This member function determines the city-block distance-metric value between two elements. A value of −1 is returned for all distances greater than 1.

Finally, an implementation of the member function "update" is provided:

```
81 void MASOM::update (int i, int j, time t)
82 {
83   element* e;
84   int k, l, d;
85
86   for (k = i - 1; k < i + 2; k++)
87   {
88     for (l = j - 1; l > j + 2; l++)
89     {
90       e = getElement(i, j);
91       if (d = distance(i, j, k, l) > -1)
92         e->setValue(e->movingAverage(Weight(t, d)));
93       else
94         e->setValue(e->movingAverage(0));
95     }
96   }
97 }
```

In the nested for-loops of lines 86-96, each element in the MASOM is considered. When the computed distance of the element from a BMU with coordinates i and j is 0 or 1, indicating that the currently considered element is either the BMU or in the neighborhood of the BMU, then the value of the element is set to the new moving average computed with an input value equal to the value returned by the function "Weight," on line 92. Otherwise, the value of the element is set to the new moving average following input of a 0 value, on line 94.

Figure 9:
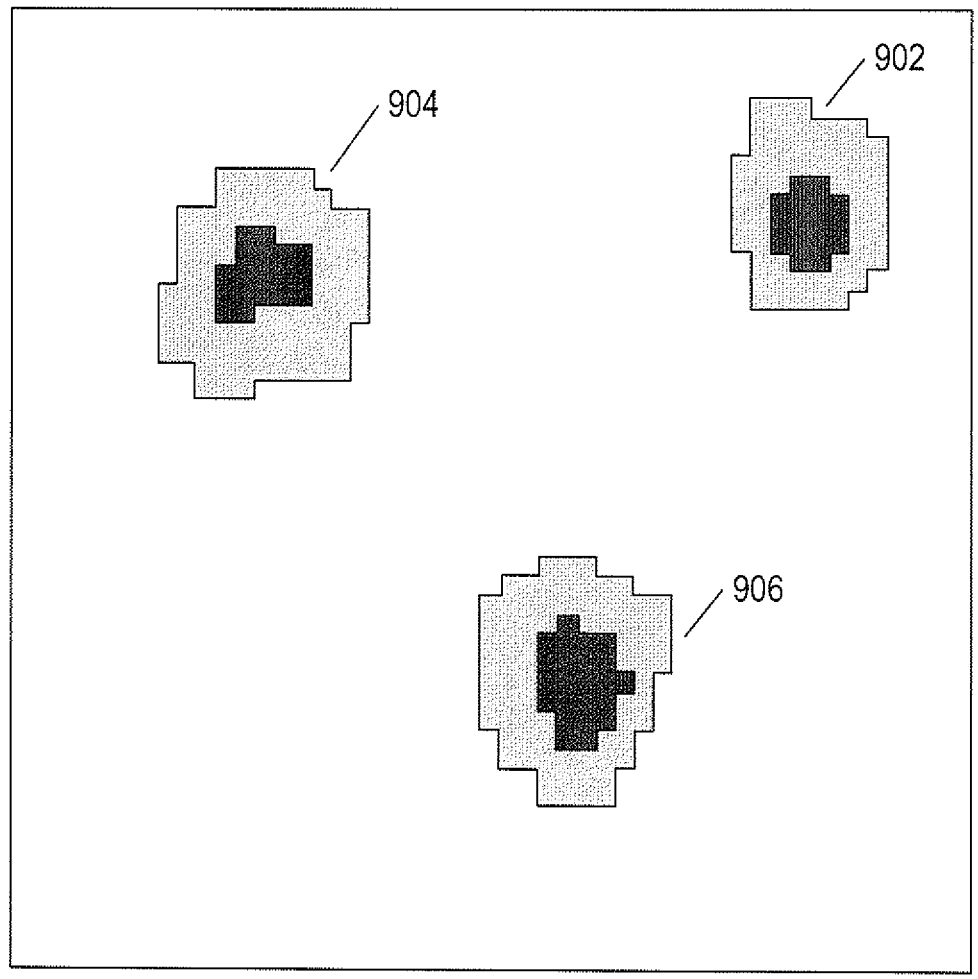
FIG. 9 shows a shading-coded visualization of a MASOM.
Figure 10:
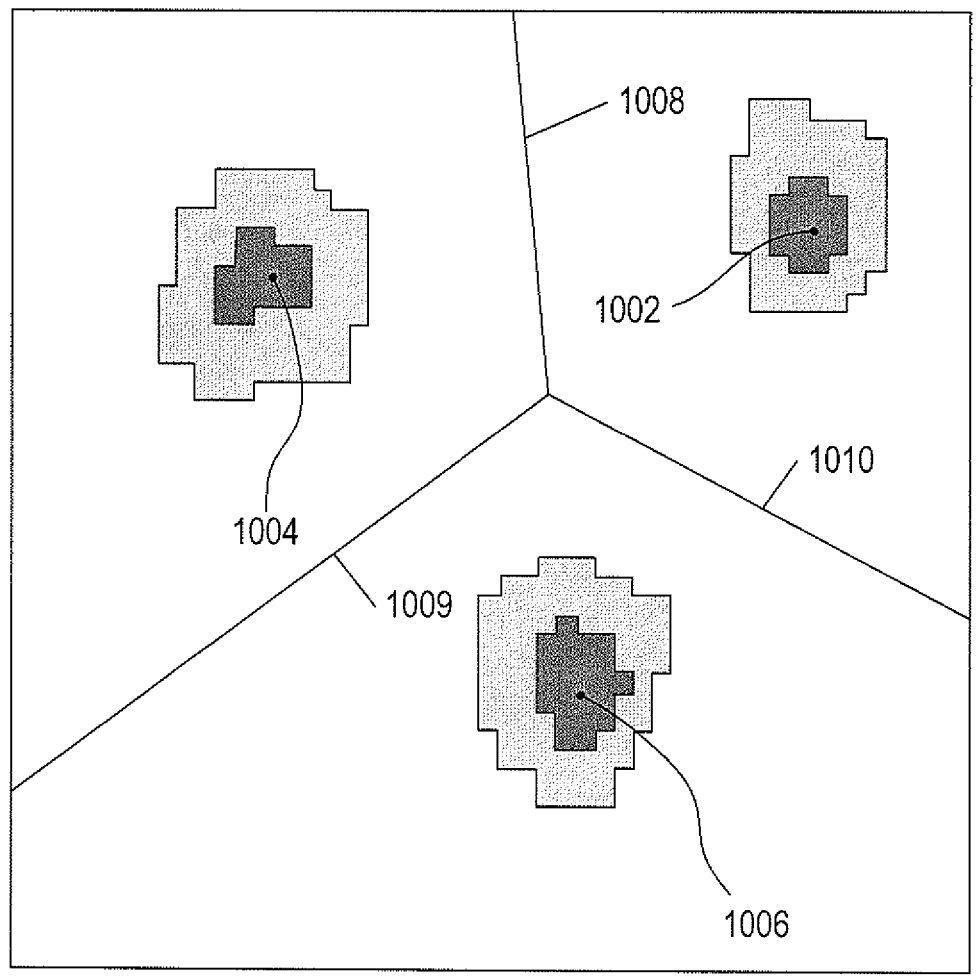
FIG. 10 illustrates the MASOM shown in FIG. 9 partitioned by a Voronoi-tessellation method into three distinct regions containing three normal states.

FIG. 9 shows a shading-coded visualization of a MASOM. In FIG. 9, the darkness of the shading is proportional to the magnitude of the scalar associated with MASOM units. As can be seen in FIG. 9, the MASOM elements associated with the largest scalar values fall within three regions 902, 904, and 906 corresponding to the three normal states 710, 711, and 712 discussed above with reference to FIG. 7. FIG. 10 illustrates the MASOM shown in FIG. 9 partitioned by a Voronoi-tessellation method into three distinct regions containing three normal states. As shown in FIG. 10, the MASOM may be partitioned by a Voronoi-tessellation method into three distinct regions corresponding to the three normal states. In this method, the centroids 1002, 1004, and 1006 of the normal states are determined and then a region is constructed for each centroid in which all points are closer to that centroid than any of the other centroids. The Voronoi tessellation, in the current example, produces the three line segments 1008-1010 that partition the MASOM into three regions containing the three normal states. The Voronoi-tessellation method is one approach to identifying the normal states in a MASOM or SOM.

Figure 11A:
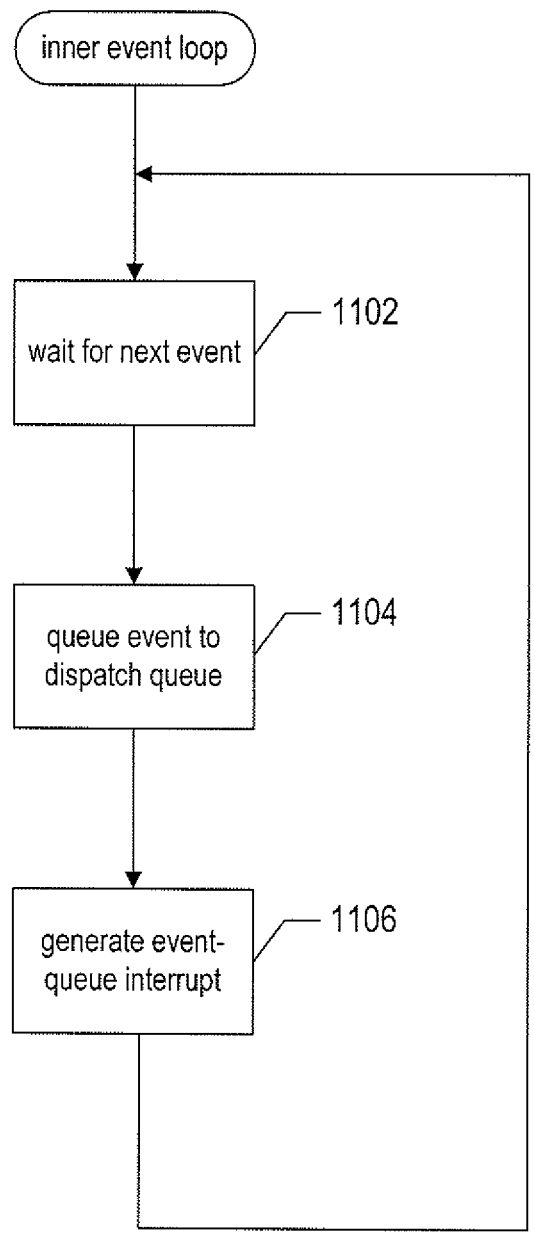
FIGS. 11A-E illustrate, using control-flow diagrams, a monitoring method that may be incorporated within a monitoring sub-system of a device or system to monitor operational characteristics of the device or system in order to identify entry of the device or system into abnormal states.

FIGS. 11A-E illustrate, using control-flow diagrams, a monitoring method that may be incorporated within a monitoring sub-system of a device or system to monitor operational characteristics of the device or system in order to identify entry of the device or system into abnormal states. FIG. 11A shows an inner event loop within the device or system. In this inner event loop, the system waits for a next event, in step 1102. When a next event occurs, the event is queued to a dispatch queue in step 1104 and an event-queue interrupt is generated in step 1106, following which the inner event loop again waits for a next event. These events may include any of many different possible events that may occur within a device or system. Generally, the inner event loop runs within the context of an operating system or other such control program.

Figure 11B:
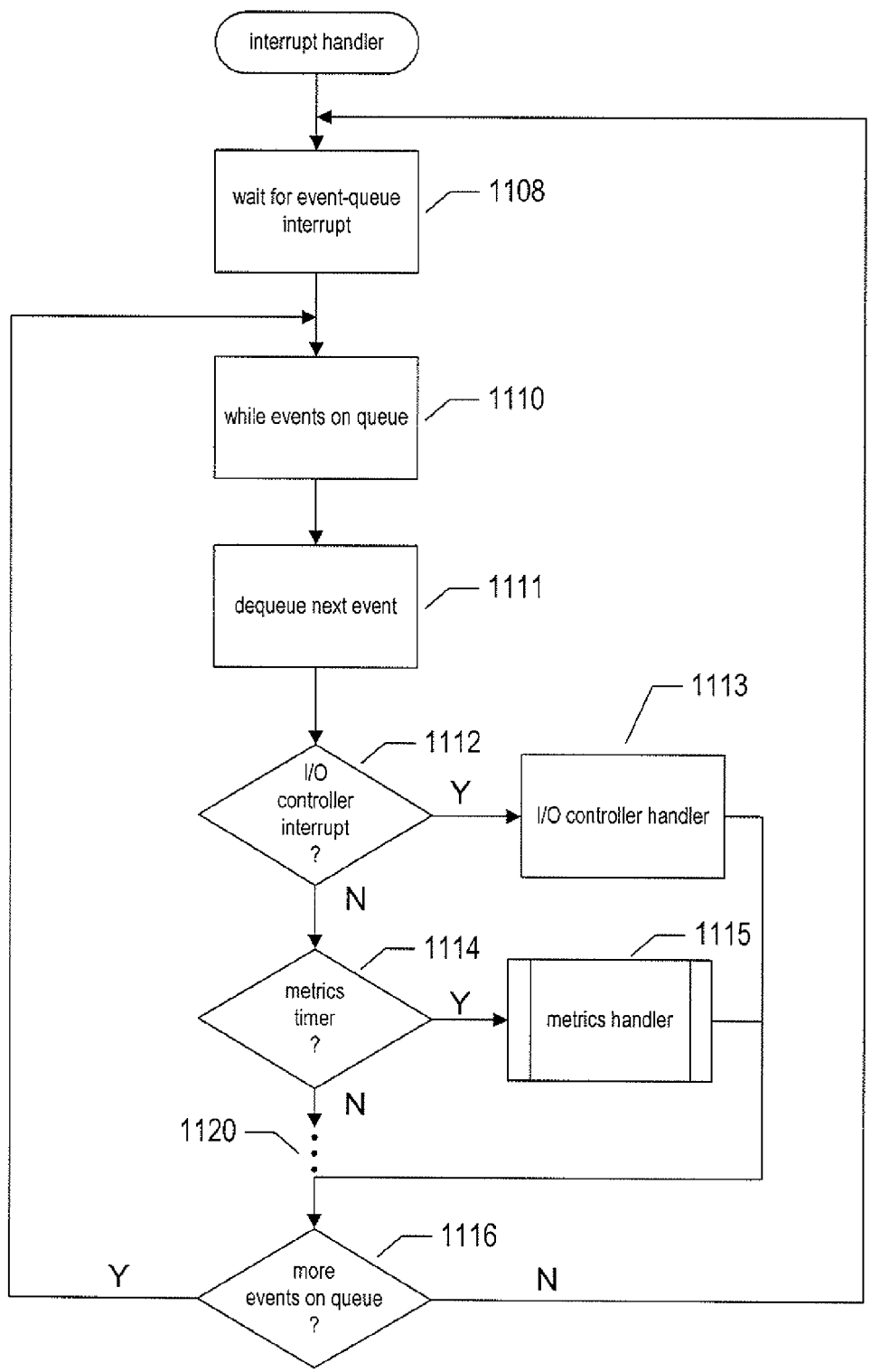

FIG. 11B provides a control-flow diagram for an interrupt handler that handles events queued to the event queue. In step 1108, the interrupt handler waits for a next event-queue interrupt. When an event-queue interrupt occurs, then, in the while-loop of steps 1110-1116, the events residing on the dispatch queue are dequeued, one per duration, and handled by a call to an appropriate handler. As indicated by ellipses 1120, there may be many different types of events with corresponding event handlers. When the event is a metrics timer event, as determined in step 1114, then a metrics handler is called in step 1115. The metrics timer event is generated at a regular interval within the device or system to trigger generation of state vectors and input the state vectors to a SOM and MASOM, in the described implementation.

Figure 11C:
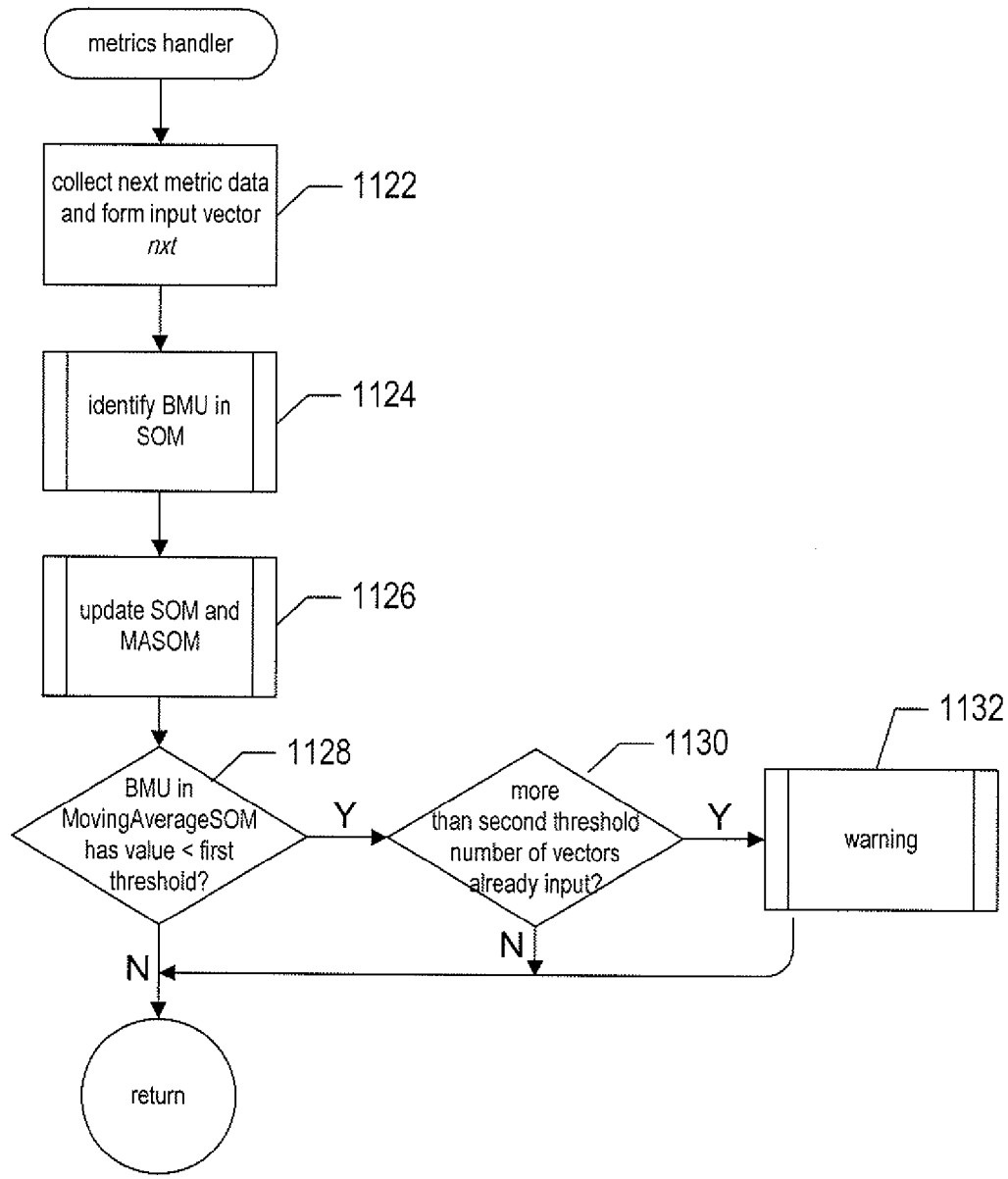

FIG. 11C provides a control-flow diagram for the metrics handler called in step 1115 in FIG. 11B. In step 1122, the metrics handler collects a next set of metric data and forms a next input state vector nxt. In step 1124, the metrics handler calls the routine "identify BMU in SOM" to identify the BMU for the input state vector nxt. In step 1126, the metrics handler updates the SOM and MASOM. In step 1128, the metrics handler determines whether the BMU in the MASOM has a scalar value less than a threshold value. When this is true, and when more than a threshold number of vectors have already been input to the metrics handler, as determined in step 1130, a warning routine is called in step 1132. The warning routine may consider other factors and values, in addition to the low scalar value of the BMU in the MASOM in order to determine whether or not it is likely that the device or system has entered an abnormal state. When such a determination is made, an appropriate warning is generated. The warning may be directed to automated components for ameliorating abnormal conditions, to a human administrator or operator, or to both an automated component and human administrator or operator.

Figure 11D:
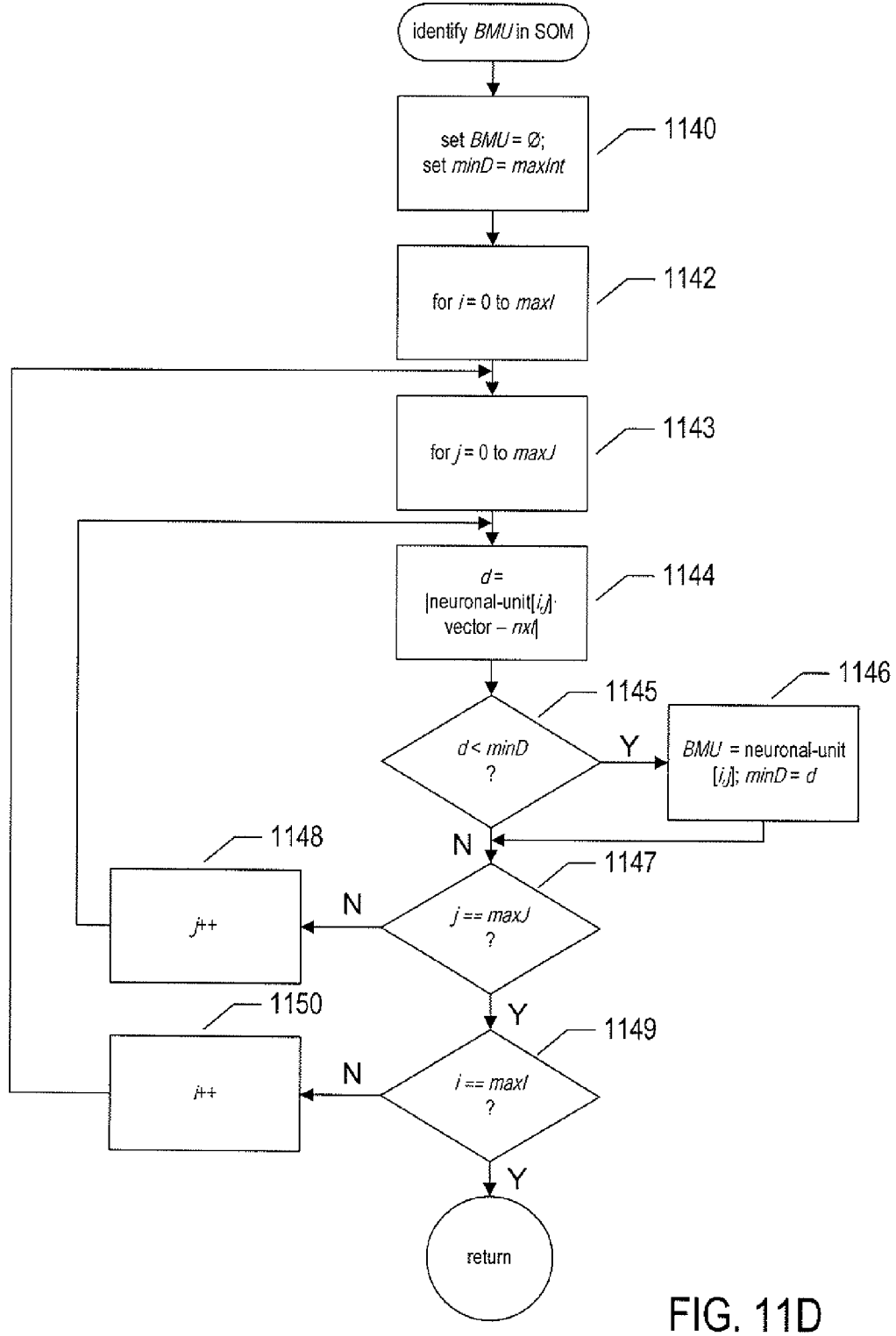

FIG. 11D provides a control-flow diagram for the routine "identify BMU in SOM" called in step 1124 in FIG. 11C. In step 1140, the routine sets local variable BMU to a null value and sets local variable minD to a large value. Then, in the nested for-loops of step 1142-1150, the routine identifies the neuronal unit in the SOM with a weight vector closest in distance to the input state vector nxt. The variable BMU may be set to a reference to the neuronal unit, a pair of coordinates in the neuronal unit, or some other indication of which of the neuronal units in the SOM is the BMU for the input state vector nxt.

Figure 11E:
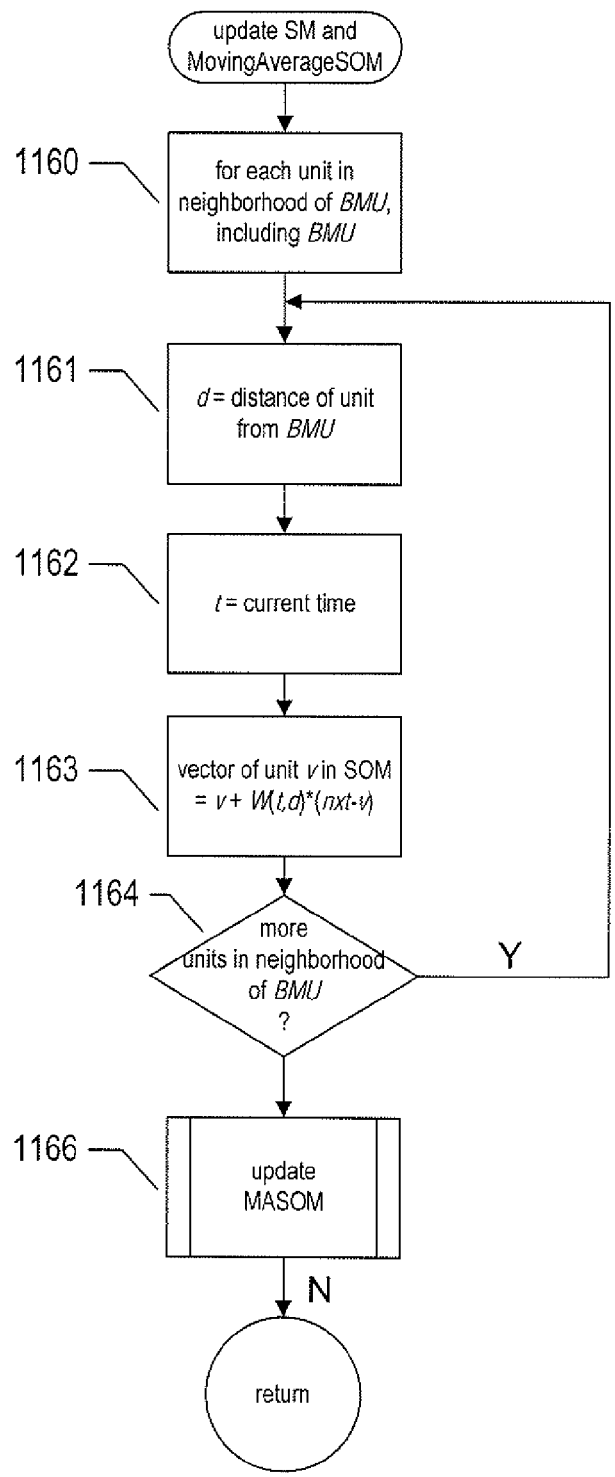

FIG. 11E provides a control-flow diagram for the routine "update SOM and MASOM" called in step 1126 of FIG. 11C. In the for-loop of steps 1160-1164, the routine updates the BMU and all neuronal units in the neighborhood of the BMU in the SOM, as discussed above with reference to FIG. 6E. Then, in step 1166, the MASOM is updated using an update routine such as that discussed above with reference to the above-provided pseudocode.

Although the present invention has been described in terms of particular embodiments, it is not intended that the invention be limited to these embodiments. Modifications within the spirit of the invention will be apparent to those skilled in the art. For example, a large number of different implementations of a monitoring method that may be incorporated into a monitoring system according to the current application can be implemented by varying any of many different design and implementation parameters, including control structures, data structures, modular organization, programming language, operating system or other control program, and other such design and implementation parameters. Many different SOM and MASOM implementations can similarly be obtained by varying designer implementation parameters. While, in the above description, both the SOM and MASOM are two dimensional, it is possible that a three-dimensional SOM or MASOM may be employed. SOM-neuronal-unit update and MASOM-element-update procedures may vary, including using different distance metrics, weighting functions, and by using other such variations.

It is appreciated that the previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. A system-monitoring method comprising:
providing a state-vector self-organizing map containing units stored in an electronic memory;
providing a moving-average self-organizing map aligned with the state-vector self-organizing map and containing elements stored in an electronic memory; and
continuously
generating a next set of metric values that defines a current state vector of a system,
determining a best-matching unit of the state-vector self-organizing map for the current state vector,
using the current state vector to update the best-matching unit and a neighborhood of the best-matching unit within the state-vector self-organizing map and elements of the moving-average self-organizing map corresponding to the best-matching unit and the neighborhood of the best-matching unit within the state-vector self-organizing map, and
when a scalar value currently associated with the element of the moving-average self-organizing map corresponding to the best-matching unit within the state-vector self-organizing map is below a threshold value, storing an indication within an electronic memory that the system has likely entered an abnormal state.

2. The system-monitoring method of claim 1 wherein generating a next set of metric values that defines a current state vector of a system further comprises:
for each of a set of metrics corresponding to dimensions of state vectors,
calling one of a system routine or application-program-interface routine to compute the metric; and
storing the computed metric in an electronic memory.

3. The system-monitoring method of claim 1 wherein determining a best-matching unit of the state-vector self-organizing map for the current state vector further comprises:
for each next-considered self-organizing-map unit,
computing a distance from the current state vector and a vector associated with the next-considered self-organizing-map unit; and
when the computed distance has a magnitude less than any distance already computed from the current state vector and another vector associated with another self-organizing-map unit, updating a stored indication of the best-matching unit to indicate the next-considered self-organizing-map unit as the best-matching unit of the state-vector self-organizing map for the current state vector.

4. The system-monitoring method of claim 3 wherein the computed distance is the length of the difference vector computed as the vector difference between the vector associated with the next-considered self-organizing-map unit and the current state vector.

5. The system-monitoring method of claim 1 wherein using the current state vector to update the best-matching unit and a neighborhood of the best-matching unit within the state-vector self-organizing map and elements of the moving-average self-organizing map corresponding to the best-matching unit and the neighborhood of the best-matching unit within the state-vector self-organizing map further comprises:
for each next-considered unit including the best-matching unit and each unit in the neighborhood of the best-matching unit within the state-vector self-organizing map,
computing a first scalar value using a first weighting function;
multiplying a vector difference between a vector associated with the next-considered unit and the current state vector by the scalar value to generate an update vector;
adding the update vector to the next-considered unit to generate a vector sum and replacing the next-considered unit with the vector sum; and
updating an element of the moving-average self-organizing map corresponding to the next-considered unit.

6. The system-monitoring method of claim 5 wherein updating an element of the moving-average self-organizing map corresponding to the next-considered unit further comprises:
computing a second scalar value using a second weighting function; and
adding the scalar value to a history of recent scalar values associated with the element of the moving-average self-organizing map.

7. The system-monitoring method of claim 6 wherein the scalar value currently associated with the element of the moving-average self-organizing map corresponding to the best-matching unit within the state-vector self organizing map is an average of the scalar values in the history of recent scalar values associated with the element of the moving-average self-organizing map corresponding to the best-matching unit of the self-organizing map.

8. The system-monitoring method of claim 6 wherein the first weighting function is identical to the second weighting function.

9. The system-monitoring method of claim 6 wherein the neighborhood of the best-matching unit includes units of the self-organizing map that share at least one edge with the best-matching unit.

10. The system-monitoring method of claim 6 wherein the neighborhood of the best-matching unit includes units of the self-organizing map that share at least one point with the best-matching unit.

11. A monitoring subsystem within a computational system having one or more memories and one or more electronic memories, the monitoring subsystem comprising:
  a state-vector self-organizing map;
  a moving-average self-organizing map aligned with the state-vector self-organizing map; and
  computer instructions fetched from one or more of the one or more memories that, when executed by one or more of the one or more processors,
    continuously
      generate a next set of metric values that defines a current state vector of a system,
      determine a best-matching unit of the state-vector self-organizing map for the current state vector,
      use the current state vector to update the best-matching unit and a neighborhood of the best-matching unit within the state-vector self-organizing map and elements of the moving-average self-organizing map corresponding to the best-matching unit and the neighborhood of the best-matching unit within the state-vector self-organizing map, and
      when a scalar value currently associated with the element of the moving-average self-organizing map corresponding to the best-matching unit within the state-vector self-organizing map is below a threshold value,
        store an indication within an electronic memory that the system has likely entered an abnormal state.

12. The monitoring subsystem of claim 11 wherein a next set of metric values that defines a current state vector of a system is generated by:
  for each of a set of metrics corresponding to dimensions of state vectors,
    calling one of a system routine or application-program-interface routine to compute the metric; and
    storing the computed metric in an electronic memory.

13. The monitoring subsystem of claim 11 wherein a best-matching unit of the state-vector self-organizing map for the current state vector is determined by:
  for each next-considered self-organizing-map unit,
    computing a distance from the current state vector and a vector associated with the next-considered self-organizing-map unit; and
    when the computed distance has a magnitude less than any distance already computed from the current state vector and another vector associated with another self-organizing-map unit, updating a stored indication of the best-matching unit to indicate the next-considered self-organizing-map unit as the best-matching unit of the state-vector self-organizing map for the current state vector.

14. The monitoring subsystem of claim 13 wherein the computed distance is the length of the difference vector computed as the vector difference between the vector associated with the next-considered self-organizing-map unit and the current state vector.

15. The monitoring subsystem of claim 11 wherein the current state vector is used to update the best-matching unit and a neighborhood of the best-matching unit within the state-vector self-organizing map and elements of the moving-average self-organizing map corresponding to the best-matching unit and the neighborhood of the best-matching unit within the state-vector self-organizing map by:
  for each next-considered unit including the best-matching unit and each unit in the neighborhood of the best-matching unit within the state-vector self-organizing map,
    computing a first scalar value using a first weighting function;
    multiplying a vector difference between a vector associated with the next-considered unit and the current state vector by the scalar value to generate an update vector;
    adding the update vector to the next-considered unit to generate a vector sum and replacing the next-considered unit with the vector sum; and
    updating an element of the moving-average self-organizing map corresponding to the next-considered unit.

16. The monitoring subsystem of claim 15 wherein an element of the moving-average self-organizing map corresponding to the next-considered unit is updated by:
  computing a second scalar value using a second weighting function; and
  adding the scalar value to a history of recent scalar values associated with the element of the moving-average self-organizing map.

17. The monitoring subsystem of claim 16 wherein the scalar value currently associated with the element of the moving-average self-organizing map corresponding to the best-matching unit within the state-vector self-organizing map is an average of the scalar values in the history of recent scalar values associated with the element of the moving-average self-organizing map corresponding to the best-matching unit of the self-organizing map.

18. The monitoring subsystem of claim 16 wherein the neighborhood of the best-matching unit includes units of the self-organizing map that share at least one edge with the best-matching unit.

19. The monitoring subsystem of claim 16 wherein the neighborhood of the best-matching unit includes units of the self-organizing map that share at least one point with the best-matching unit.

20. A computer-readable medium encoded with computer instructions that control a monitoring subsystem within a computational system having one or more memories and one or more electronic memories, the monitoring subsystem including a state-vector self-organizing map and a moving-average self-organizing map aligned with the state-vector self-organizing map, to
  continuously
    generate a next set of metric values that defines a current state vector of a system,
    determine a best-matching unit of the state-vector self-organizing map for the current state vector,
    use the current state vector to update the best-matching unit and a neighborhood of the best-matching unit within the state-vector self-organizing map and elements of the moving-average self-organizing map corresponding to the best-matching unit and the neighborhood of the best-matching unit within the state-vector self-organizing map, and
    when a scalar value currently associated with the element of the moving-average self-organizing map corresponding to the best-matching unit within the state-vector self-organizing map is below a threshold value, store an indication within an electronic memory that the system has likely entered an abnormal state.

* * * * *